United States Patent [19]

Lewis, deceased

[11] 4,288,922
[45] Sep. 15, 1981

[54] DEVICE TO INDICATE SOLAR EXPOSURE

[76] Inventor: Donald F. Lewis, deceased, late of 105 Rockwood St., Grass Valley, Calif. 95945, by Sheri Lewis, administrator

[21] Appl. No.: 33,110

[22] Filed: Apr. 25, 1979

[51] Int. Cl.³ .............................................. G01C 1/00
[52] U.S. Cl. .................................. 33/1 DD; 33/268; 33/273
[58] Field of Search ............ 33/1 DD, 268, 272, 273, 33/269, 270, 271

[56] References Cited

U.S. PATENT DOCUMENTS

| | | | |
|---|---|---|---|
| 1,817,350 | 8/1931 | Clay | 33/1 DD X |
| 2,478,315 | 8/1949 | Pollman | 33/1 DD |
| 2,884,697 | 5/1959 | Sylvester | 33/1 DD |
| 4,177,566 | 12/1979 | Haines | 33/1 DD |

Primary Examiner—William D. Martin, Jr.
Attorney, Agent, or Firm—Manfred M. Warren; Robert B. Chickering; Glen R. Grunewald

[57] ABSTRACT

A device for determining the annual solar exposure of a site which includes a wide angle viewer and a transparent screen having the paths of the sun at various times of year drawn on it, and with the viewer and screen fixed with respect to each other so that when one looks from north toward south through the viewer the paths of the sun at various times of the year are superimposed on the site being investigated.

3 Claims, 4 Drawing Figures

DEVICE TO INDICATE SOLAR EXPOSURE

BACKGROUND OF THE INVENTION

It is frequently useful and sometimes essential to be able to determine the amount of exposure to sunlight a particular site will receive during the course of the year. When selecting the location for a home, it is desirable to know whether particular areas will be sunny in the winter or if overhanging roof portions will shield windows from the southern exposure of the sun in the summer. If the structure is to use a solar energy collector, it is essential to know whether the solar energy collector will be exposed to sunlight on a year-round basis. The path the sun travels can frequently pass behind trees, hills, or structures placing portions of a specific site in shadows at some time of the year and for some portion of each day. Such problems occur not only in the winter when the sun is near the horizon and would be obscured by hills or structures, but also in the summer when the sun would be obscured by overhanging tall trees under which it would shine during the winter.

It is not only important to know whether anything will obscure sunlight, but it is also important to know how long sunlight will be obscured and at what time of day. Sun shines most intensely around solar noon and collectors that store energy should be exposed to solar radiation at that time. It is sometimes apparent that a known obstruction such as a tree or a steeple will cause a certain site to be in its shadow at some portion of each day, but it is not readily determinable at what time of day that site will be in the shadow or for how long the sun will be obscured from that site.

It is evident that selecting the proper site for a structure on a lot can be of great value to get maximum sun exposure if it is desired, to get minimum sun exposure if it is desired, or to obtain shade or exposure only at particular times of the day or particular times of the year. Such information is also useful in deciding where to plant trees and what type of trees to plant in order to obtain shade in the proper place and at the proper time of day.

In the past, devices have been available to predict sun exposure for a particular site. These devices have either been very expensive instruments or handheld devices which depend on siting with the eye along two points much as one would look along the sites of a riffle. The former devices are too expensive and the latter are not accurate.

SUMMARY OF THE INVENTION

This invention is a device for investigating the annual solar exposure of a specific site. The device of this invention is simple, inexpensive and portable, but it is extremely accurate. The device of this invention includes a flat table having means on it for attaching a flexible transparent screen along a horizontal arc. The arc may be circular or in some other form in that the transparent screen, which is marked with lines to be described hereinafter, can be marked to accommodate to the shape of the horizontal arc.

The device of this invention includes a transparent screen which is fixed to the arcurate means in such manner that it stands up vertically from the top of the table. The screen is provided with markings which indicate the line of travel of the sun at a given latitude for selected dates of the year as well as markings indicating the position of the sun at selected times of the day with respect to the north-south orientation of the table. The markings indicating the time of day will intersect the markings indicating the line of travel of the sun at different dates of the year as will be explained in more detail below.

The table is also provided with a wide angle viewer fixed to the opposite side of the table from the screen and with the axis of the angle viewer being perpendicular to the tangent of the screen at the solar noon position of the screen. The table is also provided with a compass fixed to its upper surface with the north-south axis aligned parallel to the axis of the wide angle viewer and a level positioned to indicate when the upper surface of the table is in a horizontal plane.

In other embodiments of the invention, the bottom of the table is provided with means to fix it to a tripod. The upper surface of the table may also be marked with instructions or preferably with tabulated data providing such information as the deviation between true north and magnetic north for different locations on the earth, or astronomical data.

DETAILED DESCRIPTION OF THE INVENTION

This invention may be better described with reference to the accompanying drawings.

Figure 1:
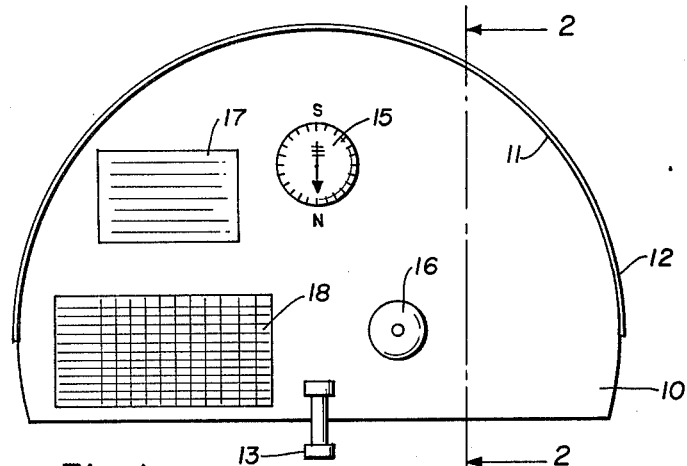
FIG. 1 is a plan view of a device embodying this invention.

The device illustrated in the drawings includes a table 10 having a flat upper surface. The table 10 is provided with an arcurate means, in this case, one entire side of the table which could be identified generally as 11, and fixed to the arcurate means is a transparent screen 12 which is illustrated in its orientation during use in FIGS. 1, 2 and 3, and illustrated in its flat condition in FIG. 4. The transparent screen is preferably made of material that is stiff but flexible such as celluloid, and it may be held to the arcurate means by any suitable means such as by being inserted into a groove, held with thumb screws or the like. A wide angle telescope or viewer 13 is fixed to the table 10 opposite the transparent screen so that the axis of the wide angle viewer is perpendicular to the tangent of the transparent screen at the portion of the transparent screen marked and positioned for solar noon, in this case, the vertical center of the screen. A compass 15 is also fixed to the upper surface of the table 10 with its north-south orientation on the same axis or on an axis parallel to the axis of the wide angle viewer 13. The tabletop also is provided with a level 16 which indicates when the plane of the upper surface of the table is horizontal. In preferred embodiments, the tabletop may be provided with printed instructions 17 and tabular data 18 to increase the usefulness of the device.

Figure 4:
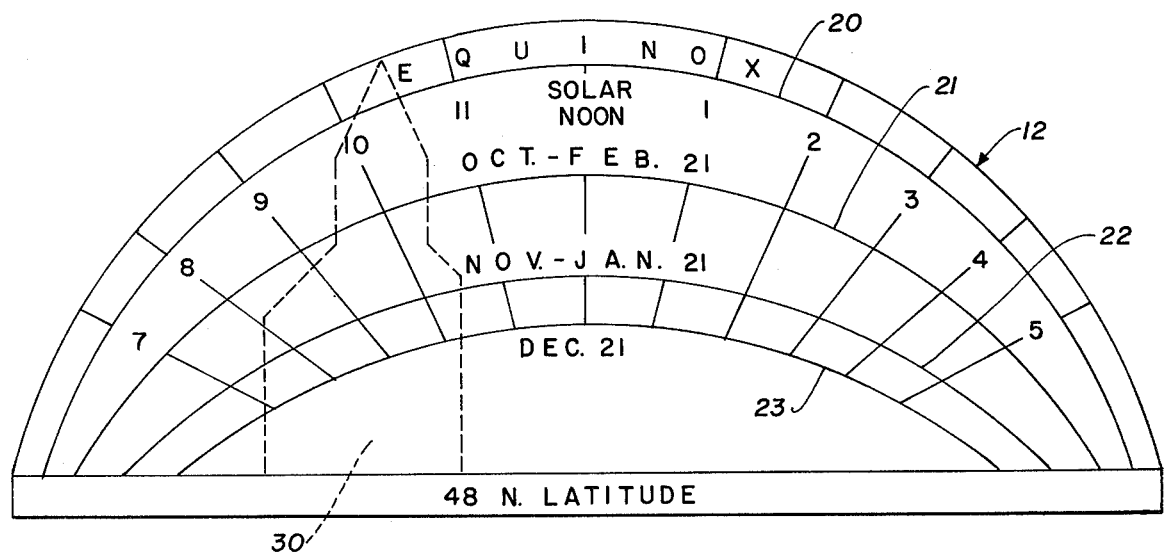
FIG. 4 is an elevation view of one transparent screen useful with the device illustrated in FIGS. 1–3.

The transparent screen in flat condition is illustrated in FIG. 4. The transparent screen is provided with markings that indicate the path of the sun and the time of day for each of a number of specific dates. The transparent screen must be made for each latitude, and such transparent screens preferably are made to be interchangeable in the device of this invention. Normally, an engineer or architect will need only one transparent screen because his range of operations would be local, however, transparent screens printed for different latitudes would be relatively inexpensive and could be made interchangeable as far as being mounted on the remainder of the device of the invention is concerned. The screen illustrated in FIG. 4 has sun path and time markings for use at 48° north latitude, which is indicated by a legend across the lower margin of the screen. When in use, the legend across the lower margin of the screen might not be visible, however, that legend is only to identify the screen and is not involved in its use.

The transparent screen 12 includes a number of arcurate lines which depict the path of the sun with respect to the horizon at various specific times of the year. The uppermost of these lines 20 is the path the sun will travel at the equinox, specifically, March 21 and September 21. The next lower line 21 depicts the path eh sun will follow on October 21 and February 21, the next lower line 22 depicts the path the sun will follow on November 21 and January 21, and the lowermost line 23 depicts the path the sun will follow at the winter solstice, specifically, December 21. It is evident that additional arcurate lines could be drawn for any particular day of the year. If one were regularly involved with placing awnings on windows or planting shade trees, the screen 12 could be vertically extended to include the summer solstice and any desired intermediate dates.

The radiating lines indicate the time of day when the sun is at a given position. The vertical line in the center of the screen is solar noon, while the radiating lines to the right of solar noon are hours of the afternoon running from 1 p.m. through 5 p.m. respectively, and the radiating lines to the left of solar noon are hours of the morning running from 7 a.m. through 11 a.m. respectively.

Figure 2:
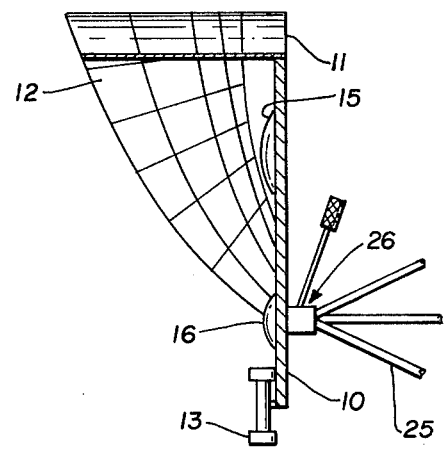
FIG. 2 is a cross section of a device illustrated in FIG. 1 taken along the line 2—2 in the direction of the arrows.
Figure 3:
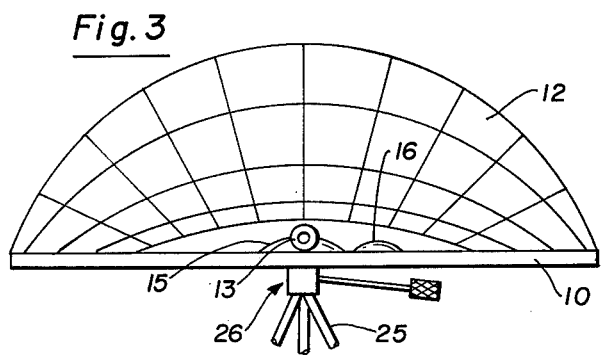
FIG. 3 is a front elevation view of the device identified in FIG. 1.

In use, the device of this invention is provided with a transparent screen for approximately the latitude of the site being investigated for solar exposure. The screen is mounted on the device of this invention as illustrated in FIGS. 1-3, and the device preferably is mounted on a tripod 25 which desirably has a swivel mechanism 26, such as those known in the art, for easily positioning the device of this invention in any horizontal or vertical orientation. The table 10 is positioned with its top in a horizontal plane and it is positioned with the wide angle viewer 13 at the northern end of the table. The compass 15 may be employed to orient the table in a north-south direction and with suitable data which may be contained in the tabular data compilation 18, adjustments of the north-south orientation of the table may be made to accommodate to deviations between magnetic north and true north. When the tabletop is oriented properly with regard to being horizontal and with the axis of wide angle viewer 13 in a true north-south direction, viewing southward through the wide angle viewer will provide information concerning solar exposure at any particular time of year. Referring to FIG. 4, the dotted line representation 30 indicates how a church might appear behind transparent screen 12 as it is viewed through wide angle viewer 13. From the site where the device of this invention is placed, it is evident that between November 21 and January 21 that particular site will be in the shadow of the church structure from approximately 7 o'clock in the morning until slightly after 10 o'clock in the morning, whereas at the equinox that site will be in the shade for perhaps one half hour, between approximately 10 a.m. and 10:30 a.m. It is also evident from FIG. 4 that that particular site will have substantially total solar exposure during the summer.

What is clamed is:

1. A device useful for investigating annual solar exposure of a specific site comprising:
    a flat table having arcurate means adapted to receive a stiff, flexible material;
    a transparent screen made of stiff, flexible material fixed to said arcurate means with said transparent screen having markings indicating the line of travel of the sun at a given latitude for selected dates of the year, and having markings indicating the position of the sun at selected times of the day with respect to the north-south orientation of said table;
    a wide angle viewer fixed to said table in a position to view said screen, with the axis of the wide angle viewer perpendicular to the tangent of said screen at the solar noon position;
    a compass fixed to said table with its north-south axis aligned parallel to the axis of said wide angle viewer; and
    a level positioned to indicate the horizontal orientation of the upper surface of said table.

2. The device of claim 1 having means below said table to fix said device to a tripod.

3. The device of claim 1 with the upper surface of said table marked with information.

* * * * *